Figure 1:
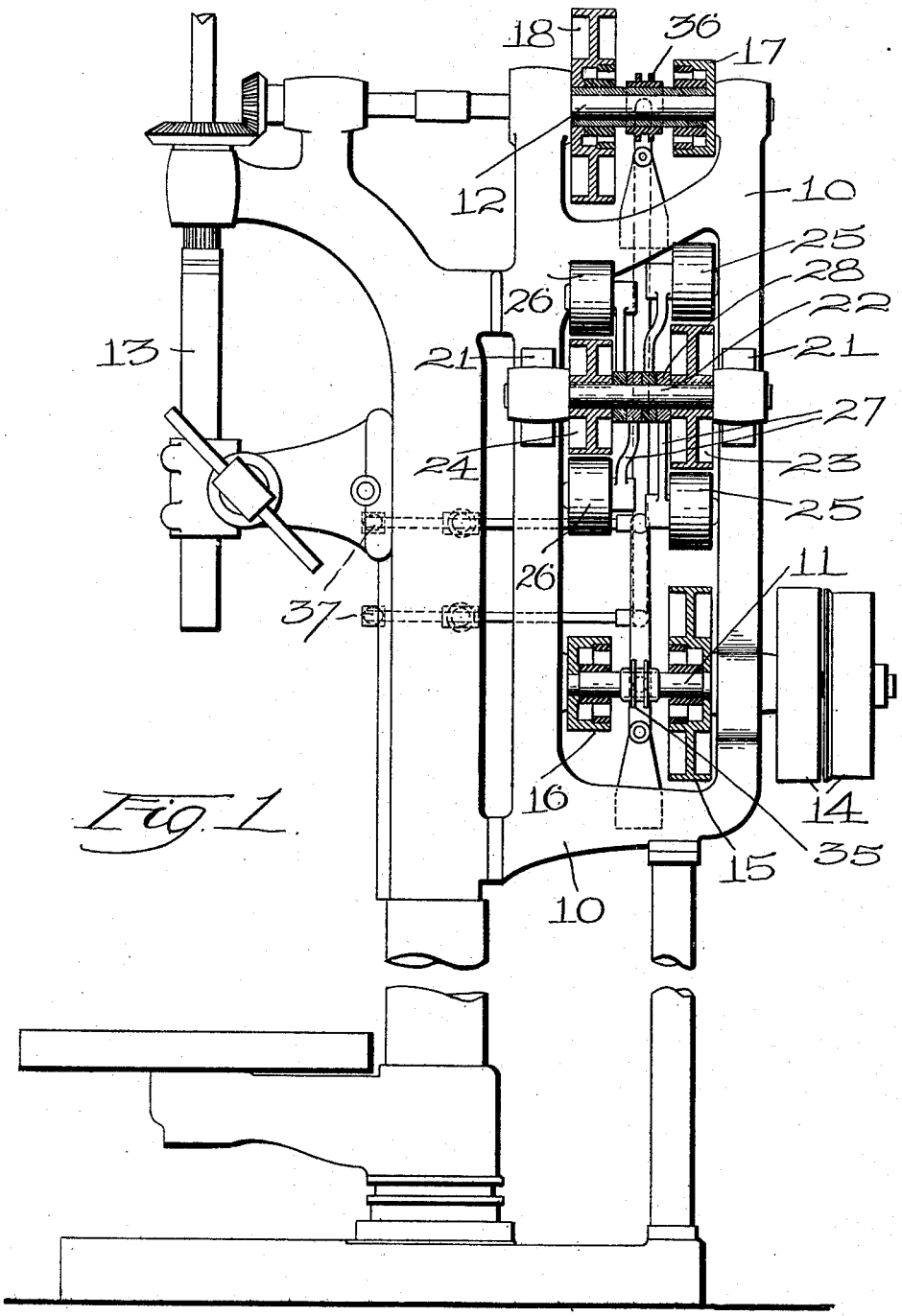

V. F. PRENTICE.
BELT DRIVE.
APPLICATION FILED APR. 18, 1910.
980,435.
Patented Jan. 3, 1911.
2 SHEETS—SHEET 2.
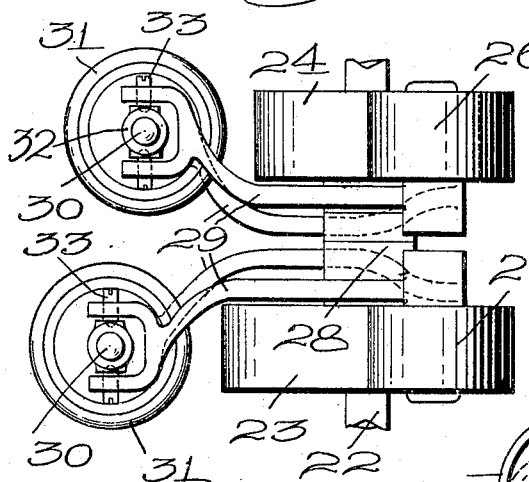
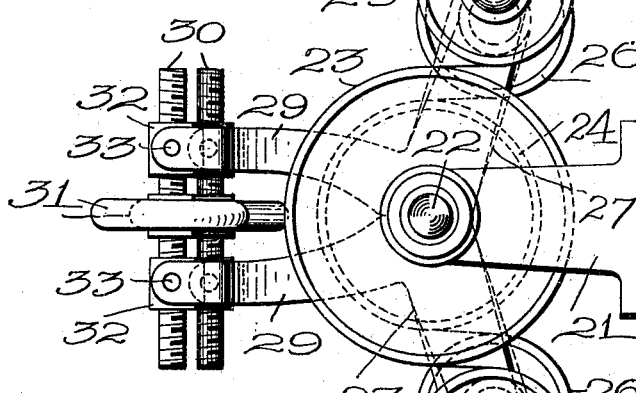

UNITED STATES PATENT OFFICE.

VERNON F. PRENTICE, OF WORCESTER, MASSACHUSETTS, ASSIGNOR TO PRENTICE BROS. COMPANY, OF WORCESTER, MASSACHUSETTS, A CORPORATION OF MASSACHUSETTS.

BELT-DRIVE.

980,435.        Specification of Letters Patent.     Patented Jan. 3, 1911.

Application filed April 18, 1910. Serial No. 556,196.

*To all whom it may concern:*

Be it known that I, VERNON F. PRENTICE, a citizen of the United States, residing at Worcester, in the county of Worcester and State of Massachusetts, have invented a new and useful Belt-Drive, of which the following is a specification.

This invention relates to a pulley drive which while capable of general use, is particularly adapted for machine tools of certain kinds.

The principal objects of the invention are to provide an efficient and practicable change speed drive in which the desired number of speed changes may be secured in a simple and convenient manner, and of such construction that the limitations imposed on change speed drives operated by gearing will be dispensed with, and any desired speed ratios can be secured; also to provide a practicable and efficient speed change belt drive suitable for machine-tools; to provide efficient means for adjusting the belt tension of such a drive; and generally to provide a practicable and efficient construction for the aforesaid purposes.

Further objects and advantages of the invention will appear hereinafter.

Reference is to be had to the accompanying drawings, in which—

Figure 1 is a side view of an upright drill showing a preferred embodiment of this invention thereon partly in central vertical section; Fig. 2 is a rear elevation of a portion of the same on enlarged scale; and Fig. 3 is a plan of a part of the mechanism with the upper portions removed.

Although shown as applied to an upright drill, it is to be understood that the invention is not limited thereto, but is capable of general use, particularly for machine tools.

In the form illustrated the upright drill is provided with a rear frame 10 on which is journaled the driving shaft 11 and driven shaft 12. The driven shaft is connected in any desired way with a spindle 13, the reverse gearing and other connections not involved in this invention not being shown. The driving shaft is shown as provided with tight and loose pulleys 14 for receiving power. It is also provided with a plurality of pulleys 15 and 16, loosely journaled thereon so that the shaft may rotate independently of them. On the driven shaft are the same number of loose pulleys 17 and 18 located in the same planes as the pulleys 15 and 16, so that a plurality of belts 19 and 20 can be used to connect them. On the frame 10 are mounted brackets 21, and on these is an intermediate third shaft 22 parallel with the driving and driven shafts and preferably located partway between them. In the present instance this shaft is located a little at one side of one strand of each of the belts. On this shaft are fixed a plurality of pulleys 23 and 24, each in the plane of one of the belts. In the present instance as two loose pulleys are shown on the shaft 11, there are also the same number of pulleys on the shafts 12 and 22, and the same number of belts. The shaft 22 is so located that the inner faces of the two pulleys thereon come substantially in line with the normal position of the strands of the belts on one side. These belts are caused to pass around the two pulleys 23 and 24 by means of idlers. Two idlers 25 engage the belt 19 and the other two idlers 26 the belt 20 on opposite sides of the pulleys 23 and 24 respectively. These idlers are mounted on arms 27 each of which extends out from a hub 28 oscillatably mounted on the third shaft 22. The arms are given such form as to permit of the arrangement of the four hubs 28 in contact with each other along the intermediate shaft between the pulleys thereon, and yet permit the idler pulleys supported by these arms to be arranged in the proper planes to engage the belts. Each hub has an outwardly extending arm 29. The two arms 29 connected with the two arms carrying the idlers 25, are connected with each other by a right and left hand screw 30 and hand wheel 31 for operating it. The same is true of the other two arms 29 which are connected with the idlers 26. These screws extend through nuts 32 held in position on the arms by pointed holding screws 33. When it is desired to increase the tension of either belt the corresponding screw 30 is operated to separate the arms 29 connected with the idlers thus forcing the idlers farther toward the belt and increasing the tension.

It will be understood, of course, that either of the pulleys 15 or 16 can be clutched to the shaft 11 by means of an ordinary clutch 35, and that the pulleys 17 and 18 can be connected with the driven shaft by a similar clutch 36. These clutches are operated by handles 37 extending to a convenient point on the machine.

From the description which has been given the operation of this drive will be obvious. It will be seen that by connecting the pulleys 15 and 17 with their respective shafts the shaft 12 will be driven directly from the shaft 11 by the belt 19. By connecting the pulleys 16 and 18 with their shafts another direct connection will be secured; but the speed of the shaft 12 will be changed. In both these cases the shaft 22 will be driven idly by the driving belt, and both the pulleys thereon will rotate. Consequently, the two pulleys on the driving and driven shafts which are loose will rotate idly at this time. For a cross drive, the pulley 15 can be clutched to the shaft 11 and the pulley 18 to the shaft 12. In that case, although the pulley 17 will be rotated directly by the belt 19 it will be an idle rotation. The belt 19 will drive the intermediate shaft positively through the pulley 23 and the latter through the pulley 24 and belt 20 will drive the pulley 18, so that the speed of the shaft 12 will be determined by the ratios of the diameters of the pulleys 15 and 23 and of the pulleys 24 and 18. The opposite drive through the pulleys 16, 24, 23 and 17 will be accomplished in a similar way.

It will be understood, of course, that while a form is shown in which a certain number of pulleys are mounted on each shaft, the invention is not limited in this particular, as the same principle can be carried out with a different number of pulleys. I am aware also that many other modifications can be made in the form of mechanism shown by any person skilled in the art without departing from the scope of the invention as expressed in the claims. Therefore, I do not wish to be limited to all the details of construction herein shown and described, but What I do claim is:—

1. In a belt drive, the combination of a driving shaft, a driven shaft, pulleys loosely mounted concentric with each of said shafts, a third shaft, pulleys fixed to the third shaft, belts extending from each pulley of the driving shaft to a pulley of the driven shaft and passing in contact with a pulley on the third shaft, and means for connecting the driving and the driven shafts each to one of the pulleys thereon.

2. In a belt drive, the combination with a driving and a driven shaft, of a plurality of pulleys loosely mounted on each shaft, a third shaft, a plurality of pulleys fixed on the third shaft, a plurality of belts each extending from a pulley on the driving shaft to a pulley on the driven shaft in contact with a pulley on the third shaft, and means for clutching any one of the pulleys on the driving and driven shafts to said shafts.

3. In a belt drive, the combination with the driving and driven shafts, of two pulleys loosely mounted on each shaft, a third shaft parallel with the driving and driven shafts, two pulleys fixed on the third shaft, each being in the plane of a pulley on the driving shaft and a pulley on the driven shaft, two belts each extending from a pulley on the driving shaft to a pulley on the driven shaft, and each in contact with one of the pulleys on the third shaft, means for connecting either one of the pulleys of the driving shaft thereto, and means for connecting either one of the pulleys on the driven shaft thereto.

4. In a belt drive, the combination with the driving and driven shafts, of two pulleys loosely mounted on each shaft, a third shaft, two pulleys fixed on the third shaft, two belts each extending from a pulley on the driving shaft to a pulley on the driven shaft and each in contact with one of the pulleys on the third shaft, means for connecting either one of the pulleys on the driving shaft thereto, and means for connecting either one of the pulleys on the driven shaft thereto, said two connecting means being independent of each other, whereby power can be transmitted from the driving shaft to the driven shaft directly through either pair of pulleys or by a cross connection between either pulley on the driving shaft and the opposite pulley on the driving shaft.

5. In a belt drive, the combination with the driving and driven shafts, of two pulleys loosely mounted on each shaft, a third shaft, two pulleys fixed on the third shaft, two belts each extending from a pulley on the driving shaft to a pulley on the driven shaft and in contact with the pulley on the third shaft, means for connecting either one of the pulleys on the driving and driven shafts thereto, said two connecting means for each shaft being independent of each other, a pair of idlers for each belt located in position to cause said belt to wrap part way around one of the pulleys on the third shaft, and means for adjusting said idlers.

6. In a belt drive, the combination with a driving shaft and a driven shaft, of pulleys loosely mounted on said shafts, an intermediate shaft, pulleys fixed to the intermediate shaft, a belt extending from each pulley on the driving shaft to a pulley on the driven shaft and passing in contact with a pulley on the intermediate shaft, means for connecting the driving and the driven shafts each to one of the pulleys thereon, an idler in contact with each belt, an arm on which said idler is mounted, and means for adjusting said idler to vary the tension of the belt.

7. In a belt drive, the combination with a driving shaft and a driven shaft, of pulleys loosely mounted on said shafts, an intermediate shaft, pulleys fixed to the intermediate shaft, a belt extending from each pulley on the driving shaft to a pulley on the driven shaft and passing in contact with a pulley on the intermediate shaft, means for connecting the driving and driven shafts each to one of the pulleys thereon, a plurality of hubs mounted on said intermediate shaft, an arm extending from each hub, an idler pulley on each arm in engagement with one of said belts, and means connected with said arm for adjusting the idlers.

8. In a belt drive, the combination with a driving and a driven shaft, of a plurality of pulleys loosely mounted on each shaft, an intermediate shaft, a plurality of pulleys fixed on the intermediate shaft, a plurality of belts each extending from a pulley on the driving shaft to a pulley on the driven shaft, means for clutching any one of the pulleys on the driving and the driven shafts to said shafts, a plurality of pairs of hubs on said intermediate shaft equal in number to the number of belts, a pair of idler pulleys connected with each pair of hubs and in contact with each belt, the pulleys of each pair being located on opposite sides of one of the pulleys on the intermediate shaft, arms extending from each of said hubs, and an adjusting means connected with each pair of arms for regulating the position of the idlers and the tension of the belt.

In testimony whereof I have hereunto set my hand, in the presence of two subscribing witnesses.

VERNON F. PRENTICE.

Witnesses:
FRANK A. CLARK,
FRED K. HENDRICKSON.